US008488290B2

(12) United States Patent
Kauffman

(10) Patent No.: US 8,488,290 B2

(45) Date of Patent: Jul. 16, 2013

(54) PROTECTIVE DEVICE

(76) Inventor: George M. Kauffman, Hudson, MA (US)

( * ) Notice: Subject to any disclaimer, the term of this patent is extended or adjusted under 35 U.S.C. 154(b) by 1088 days.

(21) Appl. No.: 12/454,178

(22) Filed: May 13, 2009

(65) Prior Publication Data

US 2009/0284887 A1 Nov. 19, 2009

Related U.S. Application Data

(63) Continuation-in-part of application No. 12/072,818, filed on Feb. 28, 2008, now Pat. No. 7,609,502, which is a continuation of application No. 10/727,076, filed on Dec. 2, 2003, now Pat. No. 7,440,253, which is a continuation-in-part of application No. PCT/US02/18919, filed on Jun. 14, 2002.

(60) Provisional application No. 61/127,450, filed on May 13, 2008, provisional application No. 60/298,439, filed on Jun. 15, 2001.

(51) Int. Cl.

| | |
|---|---|
| ***H01C 7/12*** | (2006.01) |
| ***H02H 1/00*** | (2006.01) |
| ***H02H 1/04*** | (2006.01) |
| ***H02H 3/22*** | (2006.01) |
| ***H02H 9/06*** | (2006.01) |

(52) U.S. Cl.

USPC .......................................... 361/119; 361/111

(58) Field of Classification Search

USPC ........................... 361/56, 111, 113, 117–119

See application file for complete search history.

(56) References Cited

U.S. PATENT DOCUMENTS

| | | | | |
|---|---|---|---|---|
| 3,663,901 | A * | 5/1972 | Forney, Jr. | 333/260 |
| 6,456,478 | B1 * | 9/2002 | Kuhne | 361/117 |
| 6,596,393 | B1 * | 7/2003 | Houston et al. | 428/389 |

OTHER PUBLICATIONS

“Circumferential”, Dictionary.com. <http://dictionary.reference.com/browse/circumferential>. Nov. 19, 2012.*

* cited by examiner

*Primary Examiner* — Rexford Barnie

*Assistant Examiner* — Christopher Clark

(74) *Attorney, Agent, or Firm* — Kriegsman & Kriegsman

(57) ABSTRACT

A device for protecting a radio frequency transmission line from transient voltages includes an inner conductor for transmitting communication signals of a desired frequency band and a grounded, coaxial outer conductor electrically insulated from the inner conductor by a pair of annular insulators. As one feature of the invention, a tap conductor for discharging transient voltages carried by the inner conductor that fall outside the desired frequency band is coupled at one end to the inner conductor through a press-fit connection. As another feature of the invention, a pair of high-quality contacts are mounted onto opposite ends of the outer conductor and serve, together with the inner conductor, as the only electrical contact surfaces for the protective device that transmit the desired communication signals. As another feature of the invention, each insulator has a constant outer diameter along the entirety of its length and a variable inner diameter.

16 Claims, 10 Drawing Sheets

PROTECTIVE DEVICE

CROSS-REFERENCE TO RELATED APPLICATIONS

The present application claims the benefit of U.S. Provisional Patent Application Ser. No. 61/127,450, which was filed on May 13, 2008 in the name of George M. Kauffman, and is a continuation-in-part of presently-pending U.S. patent application Ser. No. 12/072,818, filed on Feb. 28, 2008 in the name of George M. Kauffman, which is in turn a continuation of U.S. patent application Ser. No. 10/727,076, filed on Dec. 2, 2003, in the name of George M. Kauffman, now U.S. Pat. No. 7,440,253, which issued on Oct. 21, 2008, which in turn is a continuation-in-part of PCT Application Number PCT/US02/18919 filed Jun. 14, 2002 in the name of George M. Kauffman, which in turn claims the benefit of U.S. Provisional Patent Application Ser. No. 60/298,439, which was filed on Jun. 15, 2001 in the name of George M. Kauffman, all of said disclosures being incorporated herein by reference.

BACKGROUND OF THE INVENTION

The present invention relates generally to devices for transmitting electromagnetic signals of a desired frequency between a source and a load and more particularly to devices for transmitting electromagnetic signals of a desired frequency between a source and a load that additionally provide over-voltage protection to the transmission line.

A radio frequency (RF) transmission line is a structure that is designed to efficiently transmit high frequency radio frequency (RF) signals between a source and a load. An RF transmission line typically comprises two conductors, such as a pair of metal wires, that are separated by an insulating material with dielectric properties, such as a polymer or air. One type of an RF transmission line which is well known in the art is a coaxial electric device.

Coaxial electric devices, such as coaxial cables, coaxial connectors and coaxial switches, are well known in the art and are widely used to transmit electromagnetic signals over 10 MHz with minimum loss and little or no distortion. As a result, coaxial electric devices are commonly used to transmit and receive signals used in broadcast, military, police, fire, security and civilian transceiver applications as well as numerous other uses.

A coaxial electric device typically comprises an inner signal conductor which serves to transmit the desired communication signal. The inner signal conductor is separated from an outer conductor by an insulating material, or dielectric material, the outer conductor serving as the return path, or ground, for the communication signal. Such an electric device is typically referred to as coaxial because the inner and outer conductors share a common longitudinal axis. It should be noted that the relationship of the geometry of the conductors and the properties of the dielectric materials disposed between the conductors substantially define the characteristic impedance of the coaxial device.

It has been found that, on occasion, potentially harmful voltages are transmitted through RF transmission lines. In particular, radios operating in either the lower end of the ultra high frequency (UHF) band or lower frequency bands (i.e., below 500 MHz) often utilize longer antenna lengths to enhance performance compared to antennae used in higher frequency applications. In addition, the long range signal propagation characteristics of these lower frequencies allow for superior long range communication. Furthermore, since the mounting height of a radio antenna serves to increase its range, radio antennae are commonly mounted from an elevated position (e.g., a tower or mast). As a result, it has been found that radio antennae are highly susceptible to lightening strikes, the high electrical energy of a lightning strike increasing the likelihood of significant damage to any sensitive components connected to the transmission line, which is highly undesirable.

As a result, at least one RF transmission line component is commonly provided with protective means for deflecting undesirable electromagnetic impulses away from a load connected thereto. For example, it is well known in the art for a coaxial electric device to include a shunt conductor which connects the inner conductor either to the outer conductor or directly to ground. The operational frequency of protective devices which utilize shunt conductors is typically greater than 400 MHz because lower frequencies require excessively long shunt conductors. As can be appreciated, the use of excessively long shunt conductors is disfavored, among other reasons, for substantially increasing the overall size of the protective device. An example of a protective device provided with a shunt conductor for grounding undesirable impulses is shown in U.S. Pat. No. 7,440,253 to George M. Kauffman, which is hereby incorporated by reference.

Although well known in the art, coaxial electric devices of the type as described above typically suffer from at least some of following shortcomings.

As a first shortcoming, coaxial electric devices of the type as described above typically include an inner conductor that is assembled from multiple, individually machined pieces. Specifically, the inner conductor often includes a shortened, center pin that is externally threaded along its length and a pair of opposing end pins, each end pin comprising an internal threading at one end and a male or female connector at its opposite end. Accordingly, as part of the assembly process, the internally threaded end of each end pin is screwed onto a corresponding end of the center pin until the pair of end pins are drawn into conductive contact with one another. In this manner, a unitary center conductor is formed that includes either a male or female connector at each end. It is to be understood that if the device is provided with a shunt conductor (or other similar signal diverting element), a portion of the shunt conductor is typically wedged, or sandwiched, firmly between the end pins as they are drawn together on the center pin during the assembly process, thereby conductively connecting the shunt conductor to the inner conductor. As can be appreciated, it has been found that the utilization of a center conductor of the type as described in detail above significantly increases manufacturing costs. In particular, in order to provide each pin of the inner conductor with its associated threading, a complex machining process is required. Furthermore, the process of assembling the various pieces of the center conductor together and, in turn, to the shunt conductor necessitates a considerable labor requirement, thereby significantly increasing manufacturing costs, which is highly undesirable.

As a second drawback, coaxial electric devices of the type as described above include an outer conductor that is typically constructed entirely out of a highly conductive, hardened metallic material, such as brass, copper or the like, for performance purposes. However, as can be appreciated, the aforementioned materials that are traditionally used to form the outer conductor a coaxial electric device are relatively expensive in nature, which is highly undesirable. Furthermore, it is to be understood that if the outer conductor of a protective device were manufactured using a softer, less expensive conductive material, such as aluminum, the performance of the device may be compromised. Specifically, the inherent softness of alternative metals will ultimately result in their deformation in the region of contact during the coupling process. Accordingly, over time, this deformation of the material in its region of contact may result in insufficient conductive coupling, which is highly undesirable.

As a third drawback, in order to provide a conventional coaxial electric device of the type described in detail above with wideband capabilities, substantial modification of the configuration of the inner and/or outer conductor is typically required, which is highly undesirable in certain applications. In addition, it has been found that modifying the configuration of either the inner conductor or the outer conductor can in turn compromise the radio frequency (RF) performance of the device.

SUMMARY OF THE INVENTION

It is an object of the present invention to provide a new and improved device for transmitting electromagnetic signals of a desired frequency band from a source to a load.

It is another object of the present invention to provide a device as described above which diverts transient voltages which exceed a predefined threshold from the transmission line.

It is yet another object of the present invention to provide a device as described above which is limited in size, includes a limited number of parts, is inexpensive to manufacture and is easy to assemble.

It is still yet another object of the present invention to provide a device as described above which can be reused on multiple occasions without compromising its effectiveness.

It is yet still another object of the present invention to provide a device as described above which can be provided with wideband capabilities.

Accordingly, as one feature of the present invention, there is provided a protective device for transmitting electromagnetic signals of a desired frequency band, the protective device comprising (a) an outer conductor, (b) an inner conductor extending within the outer conductor, the inner and outer conductors being spaced apart and electrically insulated from one another, the inner conductor comprising a first end, a second end and an intermediary portion, and (c) a tap conductor for discharging transient voltages carried by the inner conductor that fall outside the desired frequency band, the tap conductor comprising a first end and a second end, the first end of the tap conductor being shaped to define a transverse opening, (d) wherein the intermediary portion of the inner conductor is press-fit through the transverse opening and into conductive contact with the tap conductor.

As another feature of the present invention, there is provided protective device for transmitting electromagnetic signals of a desired frequency band, the protective device comprising (a) an outer conductor comprising a first end, a second end and an intermediary section, (b) an inner conductor extending within the outer conductor, the inner and outer conductors being spaced apart and electrically insulated from one another, (c) a first contact mounted onto the first end of outer conductor, the first contact being constructed of a material that is different than the outer conductor, (d) a second contact mounted onto the second end of the outer conductor, the second contact being constructed of a material that is different than the outer conductor, (e) wherein the inner conductor, the first contact and the second contact are the only electrical contact surfaces for the protective device that transmit electromagnetic signals within the desired frequency band.

As another feature of the present invention, there is provided a protective device for transmitting electromagnetic signals, the protective device comprising (a) an outer conductor, the outer conductor being hollowed out along its length so as to define a longitudinally extending central cavity, (b) an inner conductor extending within the central cavity in the outer conductor, the inner conductor being spaced apart from the outer conductor, and (c) at least one insulator of a first dielectric material disposed in the central cavity between the inner conductor and the outer conductor, the at least one insulator being hollowed out along its length, the at least one insulator comprising a first end, a second end, an inner surface and an outer surface, (d) wherein the outer diameter of the at least one insulator is constant along its length from its first end to its second end and wherein the inner diameter of the at least one insulator is less at its first end than at its second end.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate an embodiment of the invention and, together with the description, serve to explain the principles of the invention. In the drawings wherein like reference numerals represent like parts:

FIG. 6(*b*) is an enlarged, top plan view of the tap conductor and spring pin shown in FIG. 5;

DETAILED DESCRIPTION OF A PREFERRED EMBODIMENT

Figure 1:
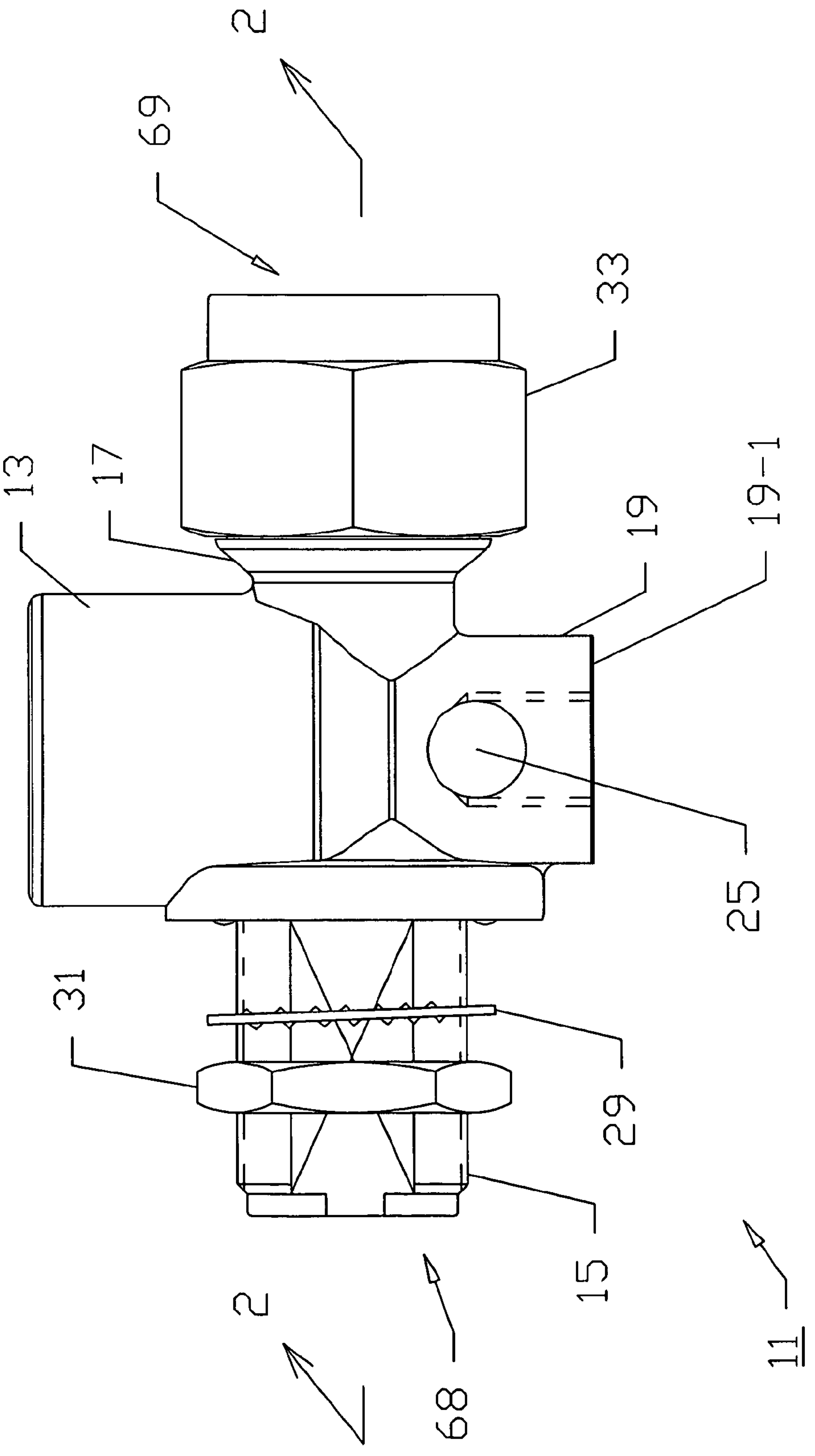
FIG. 1 is a front plan view of a protective device for an RF transmission line, the protective device being constructed according to the teachings of the present invention, the first end of the outer conductor being shown without external threadings for simplicity purposes.
Figure 2:
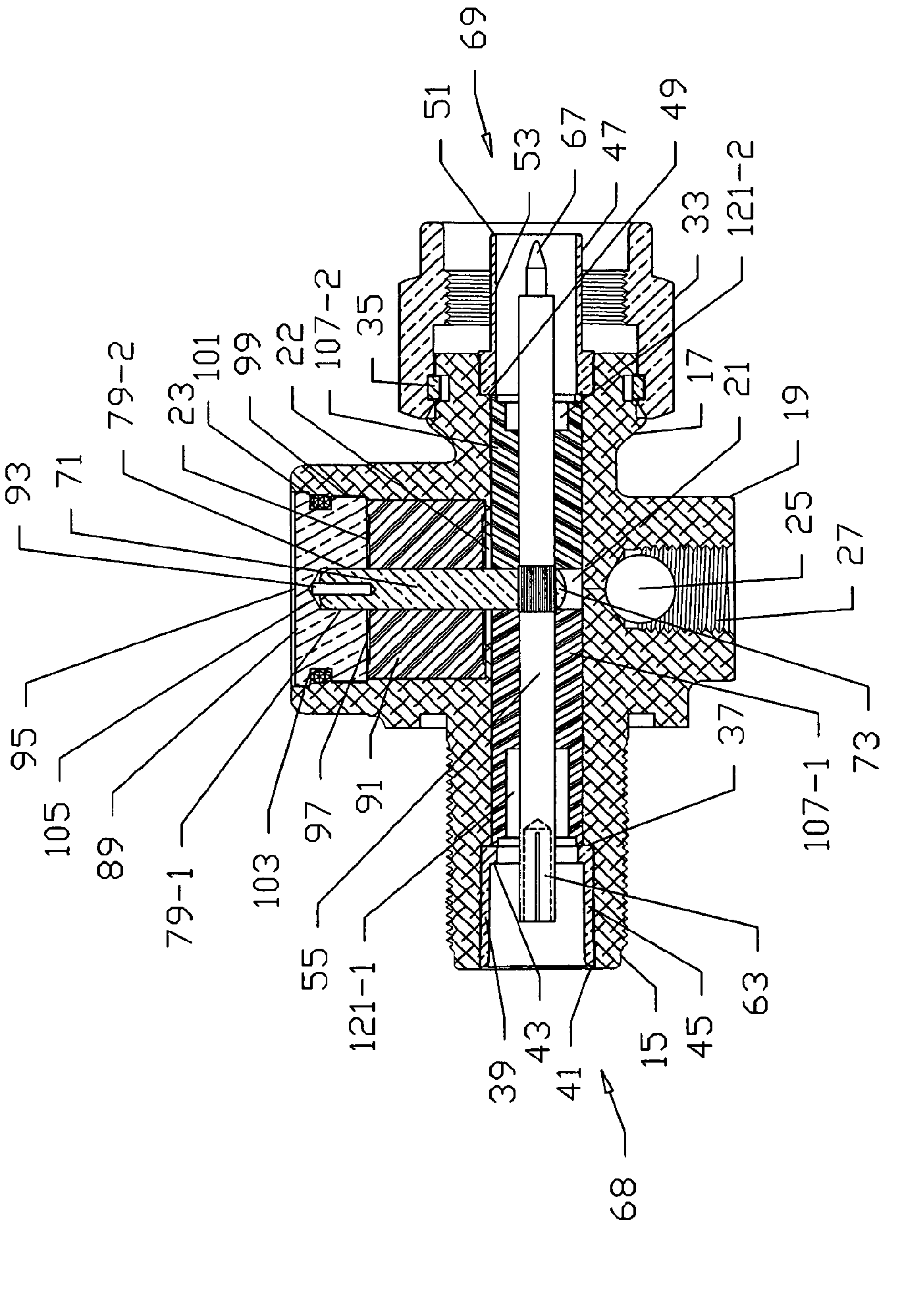
FIG. 2 is a section view of the protective device shown in FIG. 1 taken along lines 2-2, the protective device being shown with the hex nut and lock washer removed from the first end of the outer conductor.

Referring now to FIGS. 1 and 2, there is shown a protective device for a radio frequency (RF) transmission line that is designed to transmit electromagnetic signals of a desired frequency band between a source and a load, the protective device being constructed according to the teachings of the present invention and represented generally by reference numeral 11. As will be described further below, protective device provides over-voltage protection to the transmission line, thereby precluding potentially harmful transient voltages from being transmitted to the load.

Protective device 11 comprises an outer conductor 13 that serves as the return path, or ground, for the communication signal. Preferably, outer conductor 13 is cast, forged or otherwise constructed from a single conductive material that is relatively inexpensive in nature, such as aluminum, zinc, aluminum-based alloys or zinc-based alloys. As will be described further in detail below, protective device 11 is specifically designed so that outer conductor 13 does not serve as a direct contact surface (i.e., connection point) through which a communication signal is transmitted to a secondary electric device. As a result, the relatively large outer conductor 13 can be constructed out of a relatively inexpensive material, thereby significantly reducing the overall costs associated with the manufacture of device 11, which is highly desirable.

It is to be understood that outer conductor 13 is not limited to the one-piece construction described herein. Rather, it is to be understood that outer conductor 13 could be alternatively formed from a plurality of conductive materials that are permanently joined together using any combination of conventional coupling techniques, such as fusion, solder, threaded or press-fit techniques, without departing from the spirit of the present invention.

Outer conductor 13 is generally formed as enlarged, elongated, generally tubular member that includes a first end 15, a second end 17 and an intermediary section 19. As seen most clearly in FIG. 2, outer conductor 13 is hollowed out along its length so as to define a partially enclosed, longitudinally extending, central cavity 21.

Intermediary section 19 of outer conductor 13 is shaped to define an externally-accessible auxiliary cavity 23 that extends transversely in relation to central cavity 21. A narrow aperture 22 is formed in outer conductor 13 that renders auxiliary cavity 23 and central cavity 21 in communication with one another. As will be described further below, auxiliary cavity 23 is provided to receive an element for diverting potentially harmful electrical energy transmitted by device 11 away from a load coupled thereto.

Intermediary section 19 of outer conductor 13 is additionally shaped to define both (i) a cross hole 25 that is circular in transverse cross-section and (ii) a threaded bore 27 that extends in from a flattened surface 19-1 on intermediary section 19 in an orthogonal relationship relative to cross hole 25, the inner terminus of bore 27 being in communication with cross hole 25. As such, it is to be understood that cross hole 25 is dimensioned to receive a ground wire which can be held firmly in place and in contact against outer conductor 13 by a threaded fastener inserted into bore 27, as will be described further in detail below.

First end 15 of outer conductor 13 is represented herein as being in the form of an industry-standard jack connector with external threads on its outer surface. As seen in FIG. 1, a lock washer 29 and a threaded hex nut 31 are mounted on first end 15 to facilitate connection of jack connector with a mating plug connector, as will be described further in detail below.

Similarly, second end 17 of outer conductor 13 is represented herein as being in the form of an industry-standard plug connector that designed for connection with a mating jack connector. As seen most clearly in FIG. 2, a coupling nut 33 with a threaded inner surface is slidably mounted onto second end 17 and is held in place by an appropriate retention device 35, such as a C-shaped ring, collar or rollover. Furthermore, a rubber gasket, or O-ring, (not shown) may additionally be disposed between coupling nut 33 and second end 17 to create an adequate seal between second end 17 and a mating connector attached thereto.

However, it is to be understood that first end 15 and second end 17 are not limited to the aforementioned connector types but rather could be constructed in alternative configurations without departing from the spirit of the present invention.

Referring now to FIG. 2, a counterbore 37 is formed in first end 15 of outer conductor 13 within central cavity 21. Furthermore, a bushing, or contact, 39 is press-fit into counterbore 37 and into direct contact against first end 15 of outer conductor 13. Bushing 39 includes an open outer end 41, a partially enclosed inner end 43 and an intermediate section 45, intermediate section 45 tapering slightly outward from inner end 43 to outer end 41. As can be appreciated, flattened inner end 43 of counterbore 37 is referred to herein as a stop surface, or reference plane, since inner end 43 serves the primary electrical contact surface for the return path of the communication signal at first end 15.

As noted briefly above, because bushing 39 serves as an electrical contact surface for the communication signal at first end 15, bushing 39 is preferably constructed of a metal material and finish that is highly suitable for repeated electrical connection, such as copper, brass (with or without a silver finish), bronze or combinations thereof (e.g., copper-based alloys), all of said materials being relatively expensive in nature. To the contrary, because outer conductor 13 does not act as a direct electrical contact surface for the return path of the communication signal at first end 15, a more economically suitable metallic material may be used to construct the enlarged outer conductor 13, such as aluminum, aluminum-based alloys, zinc or zinc-based alloys.

It should also be noted that bushing 39 is not limited to having a generally cylindrical shape which is at least partially enclosed at one end. Rather, it is to be understood that bushing 39 could be formed in alternative configurations without departing from the spirit of the present invention. For example, because the partially enclosed inner end 43 of bushing 39 serves as the stop surface, the remainder of bushing 39 could be removed in certain circumstances without compromising functionality.

Similarly, a collar, or contact, 47 is directly affixed to second end 17 of outer conductor 13 using any suitable coupling means, such as press-fit or complementary threadings. Collar 47 is represented herein as being in the form of a generally cylindrical sleeve with an open inner end 49 that is positioned within central cavity 21, an open outer end 51 and an elongated intermediate section 53 that is preferably provided with axial slots to increase flexibility. As can be appreciated, open outer end 51 is referred to herein as a reference plane since end 51 serves as the primary electrical contact surface for the return path of the communication signal at second end 17.

Figure 3:
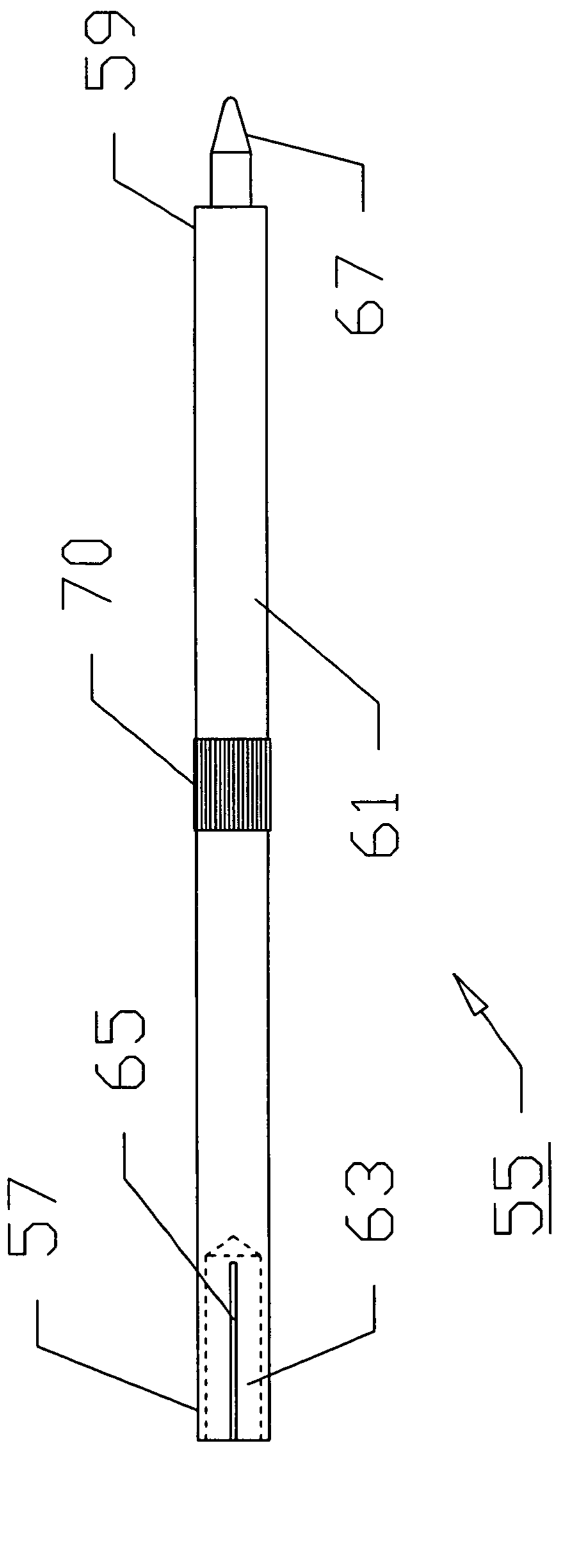
FIG. 3 is an enlarged, front plan view of the inner conductor shown in FIG. 2.

As seen most clearly in FIGS. 2 and 3, an inner, or center, conductor 55 is disposed within central cavity 21 and extends in a coaxial relationship relative to outer conductor 13, inner conductor 55 serving to transmit the desired communication signal for device 11. Inner conductor 55 is preferably constructed of a highly conductive material that is suitable for transmitting electrical signals, such as copper, brass, bronze or combinations thereof, and is conductively isolated from outer conductor 13 by at least one dielectric material, as will be described further below.

Inner conductor 55 is preferably constructed as a unitary member and includes a first end 57, a second end 59 and an intermediate portion 61. As can be seen, first end 57 is in the form of a female connector that is shaped to define an interior receptacle 63 that is dimensioned to fittingly receive a corresponding male pin, first end 57 preferably being provided with at least one axial slot 65 to allow for a slight degree of expansion during the connection process. Similarly, second end 59 is in the form of a male connector, the male connector being represented herein as a reduced diameter pin 67 that tapers inward to a rounded point at its free end to facilitate insertion into a complementary female connector.

Accordingly, it is to be understood that first end 15 of outer conductor 13, first end 57 of inner conductor 55 and bushing 39 together form a first coaxial connector interface 68. Similarly, it is to be understood that second end 17 of outer conductor 13, second end 59 of inner conductor 55 and collar 47 together form a second coaxial connector interface 69. As will be described further in detail below, first and second coaxial electric devices can be releasably joined together by coupling a connector interface similar to first coaxial connector interface 68 on one of said devices with a connector interface similar to second coaxial connector interface 69 on the other of said devices, thereby establishing a conductive path therebetween.

As seen most clearly in FIG. 3, intermediate portion 61 includes a roughened section 70 at its approximate midpoint that is slightly larger in diameter than the remainder of intermediate portion 61, roughened section 70 serving as the region of contact with a shunting device, as will be described further in detail below. Roughened section 70 is represented herein as being linearly knurled. However, it is to be understood that section 70 could be roughened in an alternative manner, such as with a diamond knurl, without departing from the spirit of the present invention.

Figure 4B:
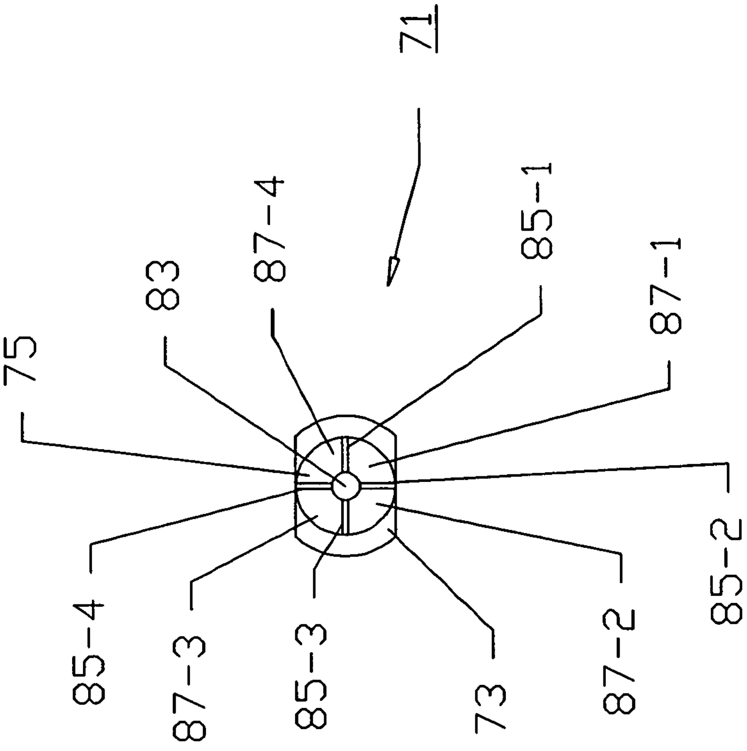
FIGS. 4(*a*) and 4(*b*) are enlarged, right side and top plan views, respectively, of the tap conductor shown in FIG. 2.
Figure 4A:
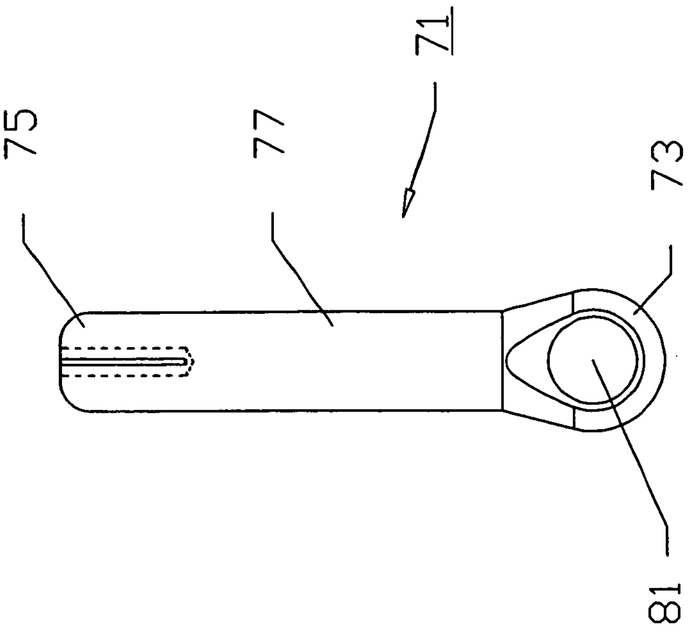

Referring now to FIGS. 2, 4(*a*) and 4(*b*), protective device 11 includes a tap, or shunt, conductor 71 that serves to divert potentially harmful, high frequency signals away from inner conductor 55. For reasons to become apparent below, tap conductor 71 is preferably constructed as a unitary member from a relatively soft metallic material, such as a softened brass.

Tap conductor 71 comprises a first end 73, a second end 75, an intermediate section 77 and opposed flattened surfaces 79-1 and 79-2. First end 73 has a generally teardrop-shaped design and is shaped to include a transverse hole 81 that is generally circular in cross-section. As will be described further below, hole 81 is dimensioned to fittingly receive roughened section 70 of inner conductor 55.

As seen most clearly in FIG. 4(*b*), rounded second end 75 of tap conductor 71 is generally circular in transverse cross-section and includes a central longitudinal bore 83, bore 83 being formed by any suitable means, such as drilling. Rounded second end 75 is also shaped to include a plurality of slots 85-1 thru 85-4 that are spaced equidistantly from one another. As can be seen, slots 85 define a plurality of wedged-shaped, independently movable fingers 87-1 thru 87-4 in second end 75. As will be described further below, each finger 87 is capable of being radially displaced which in turn enables the transverse cross-section of second end 75 to be adjusted when necessary.

Figure 5:
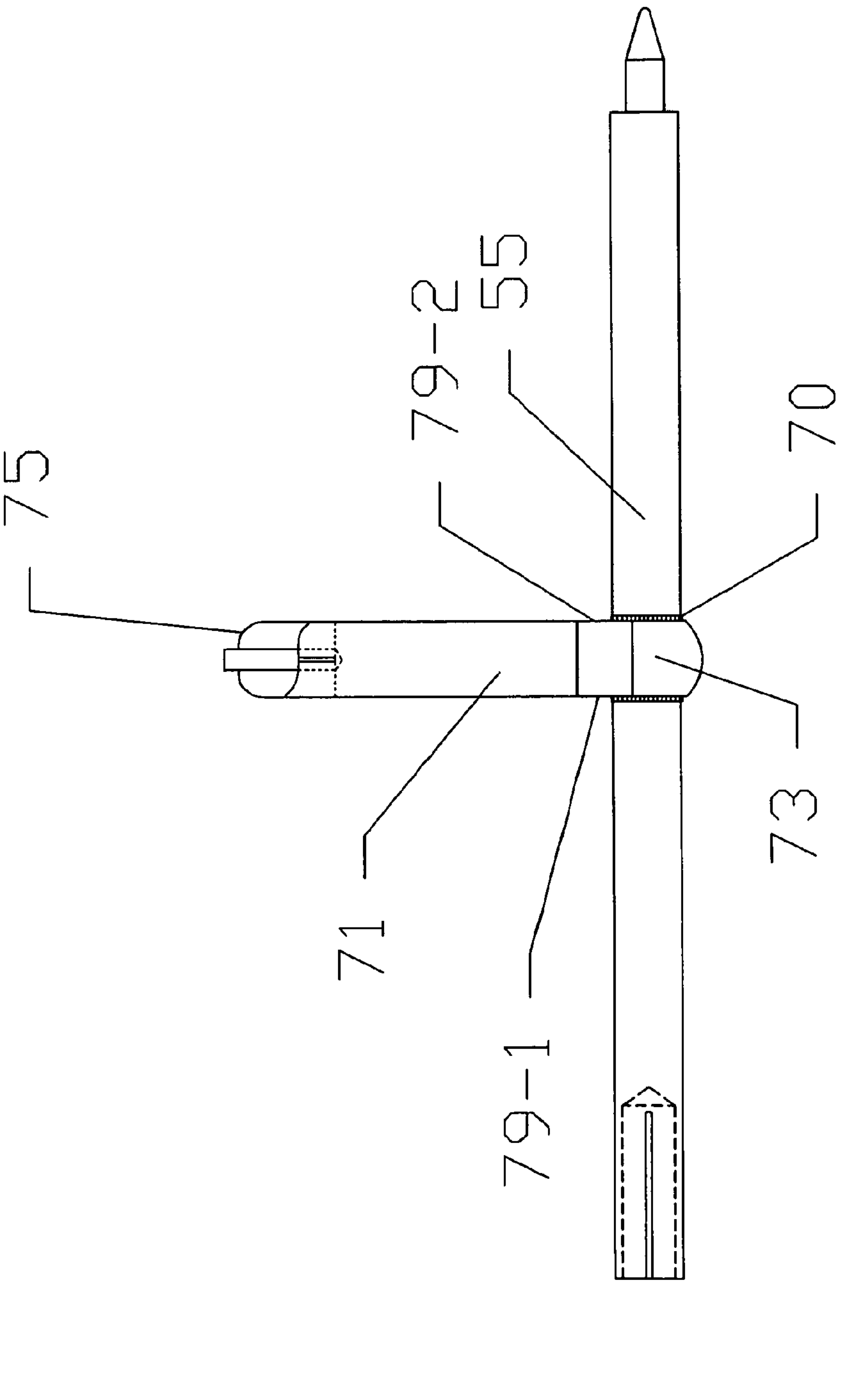
FIG. 5 is an enlarged, front plan view of the center conductor, tap conductor and spring pin shown in FIG. 2, the tap conductor being shown broken away in part.

Referring now to FIG. 5, inner conductor 55 is sized and shaped to be press-fit through first end 73 of tap conductor 71 in order to conductively couple said components. Specifically, it should first be noted that (i) the cross-sectional diameter of roughened section 70 is slightly greater than the cross-sectional diameter of hole 81 in tap conductor 71 and (ii) tap conductor 71 is constructed of a softer material than inner conductor 55. Accordingly, it is to be understood that as inner conductor 55 is driven through hole 81, roughened section 70 digs into the portion of tap conductor 71 that immediately surrounds hole 81 at multiple locations, thereby conductively coupling tap conductor 71 to inner conductor 55.

It should be noted that the above-described method for coupling tap conductor 71 to inner conductor 55 provides a number of notable advantages and, as such, serves as a principal novel feature of the present invention. As a first advantage, by press-fitting inner conductor 55 through hole 81, an area of contact is established between inner conductor 55 and tap conductor 71 that extends 360 degrees about the longitudinal axis of inner conductor 55, which is highly desirable. As a second advantage, the insertion force required to press-fit inner conductor 55 through hole 81 is minimized due to the interrelationship and relative hardness of the two components, which is highly desirable. As a third advantage, because roughened surface 70 of inner conductor 55 partially embeds into tap conductor 71, there is less sensitivity to manufacturing tolerances disrupting the quality of the press-fit contact established therebetween, which is highly desirable.

As shown in FIG. 2, with first end 73 of tap conductor 71 connected to inner conductor 55, the remainder of tap conductor 71 protrudes orthogonally away from inner conductor 55, projects through aperture 22 and extends into auxiliary cavity 23. As will be described further below, tap conductor 71 is conductively coupled to grounded outer conductor 13 through a conductive end cap 89.

Specifically, as part of the assembly process for device 11, an annularly-shaped insulator 91 is axially mounted onto second end 75 of tap conductor 71. Preferably, the outer diameter of insulator 91 is dimensioned to fittingly receive within auxiliary cavity 23. In this manner, insulator 91 serves as a structural support for retaining tap conductor 71 fixed in place. However, it is to be understood that insulator 91 could be replaced with alternative types and configurations of dielectric mediums, such as air, without departing from the spirit of the present invention.

Figure 6A:
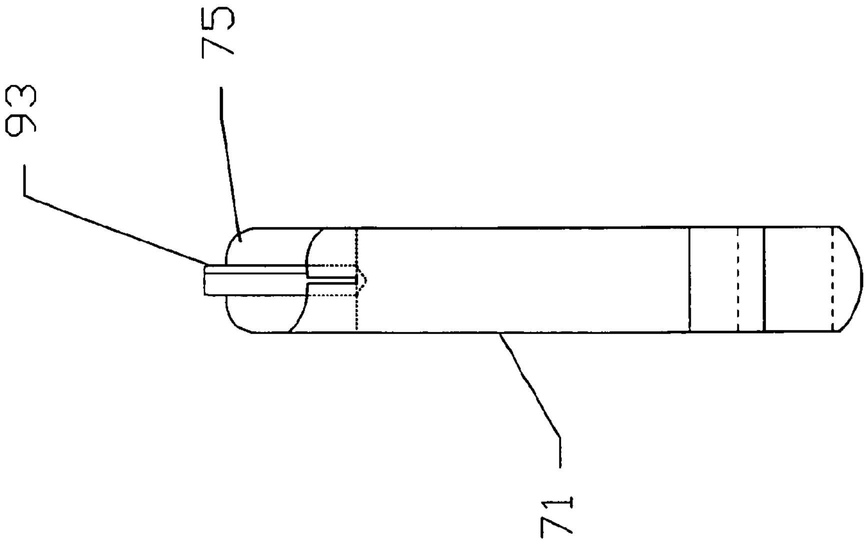
FIG. 6(*a*) is an enlarged, front plan view, broken away in part, of the tap conductor and the spring pin shown in FIG. 5.
Figure 6B:
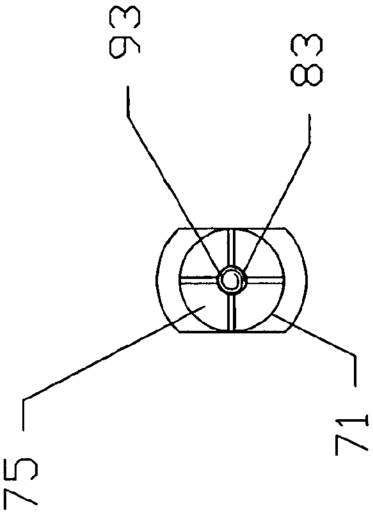
Figure 7:
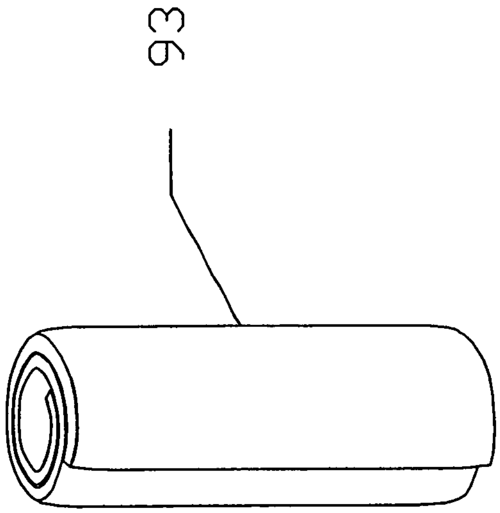
FIG. 7 is an enlarged, top perspective view of the spring pin shown in FIG. 5.

Referring now to FIGS. 6(*a*) and 6(*b*), a spring pin 93 is axially driven into bore 83 in second end 75 of tap conductor 71. As seen most clearly in FIG. 7, spring pin 93 is constructed as a thin layer of resilient metallic material, such as stainless steel, that is coiled (i.e., concentrically wrapped) about a common longitudinal axis. Due to its construction, the generally-cylindrical spring pin 93 is capable of being radially compressed, thereby reducing its outer diameter, upon receiving a suitable compressive force. Due to its resilient construction, spring pin 93 is designed to expand back to its original dimensions upon withdrawal of the compressive force.

Accordingly, as seen in FIGS. 6(*a*) and 6(*b*), spring pin 93 is dimensioned to slightly expand the outer diameter of second end 75 of tap conductor 71 upon insertion into bore 83. With insulator 91 axially mounted onto tap conductor 71 and spring pin 93 inserted into bore 83, end cap 89 is mounted directly upon second end 75 of tap conductor 71. As seen most clearly in FIG. 2, end cap 89 is constructed as a unitary, solid, cylindrically-shaped block that includes a top surface 95, a bottom surface 97 and a continuous side wall 99. Preferably, end cap 89 is constructed of a rigid, durable and highly conductive metallic material, such as brass. Furthermore, end cap 89 is preferably dimensioned to fittingly project into auxiliary cavity 23 and in turn conductively connect with outer conductor 13 by any suitable securement means, such as through a press-fit contact or through the use of complementary threadings. An O-ring 101 is preferably mounted within a lateral groove 103 formed in side wall 99 and serves as a seal between end cap 89 and outer conductor 13.

A inwardly extending bore 105 is preferably formed into bottom surface 97 of end cap 89 and is dimensioned to fittingly receive second end 75 of tap conductor 71. Specifically, with spring pin 93 inserted into bore 83, end cap 89 is axially mounted onto tap conductor 71 such that second end 75 projects into bore 105. Preferably, bore 105 is dimensioned such that, as end cap 89 is axially mounted onto tap conductor 71, end cap 89 exerts a slight inward radial force onto second end 75. In turn, spring pin 93 compresses to the extent necessary that second end 75 can press fit into bore 105, the resilient nature of spring pin 93 resulting in the continuous application of an outward radial force by fingers 87 onto end cap 89. As can be appreciated, this continuous outward force applied by fingers 87 against end cap 89 serves to strengthen the securement of end cap 89 onto tap conductor 71, which is highly desirable.

It should be noted that, without the inclusion of coiled spring pin 93, end cap 89 may not be adequately retained on tap conductor 71. Specifically, because tap conductor 71 is preferably constructed of a soft material, simply press-fitting end cap 89 onto tap conductor 71 may result in significant deformation of second end 75 if any radial force is applied to end cap 89 (e.g., to accommodate for manufacturing tolerances). As can be appreciated, significant deformation of second end 75 may ultimately compromise the quality of the press-fit. As a result, the use of spring pin 93 to retain end cap 89 fixedly mounted on tap conductor 71 provides a notable advantage and, as such, serves as a principal feature of the present invention.

Figure 8:
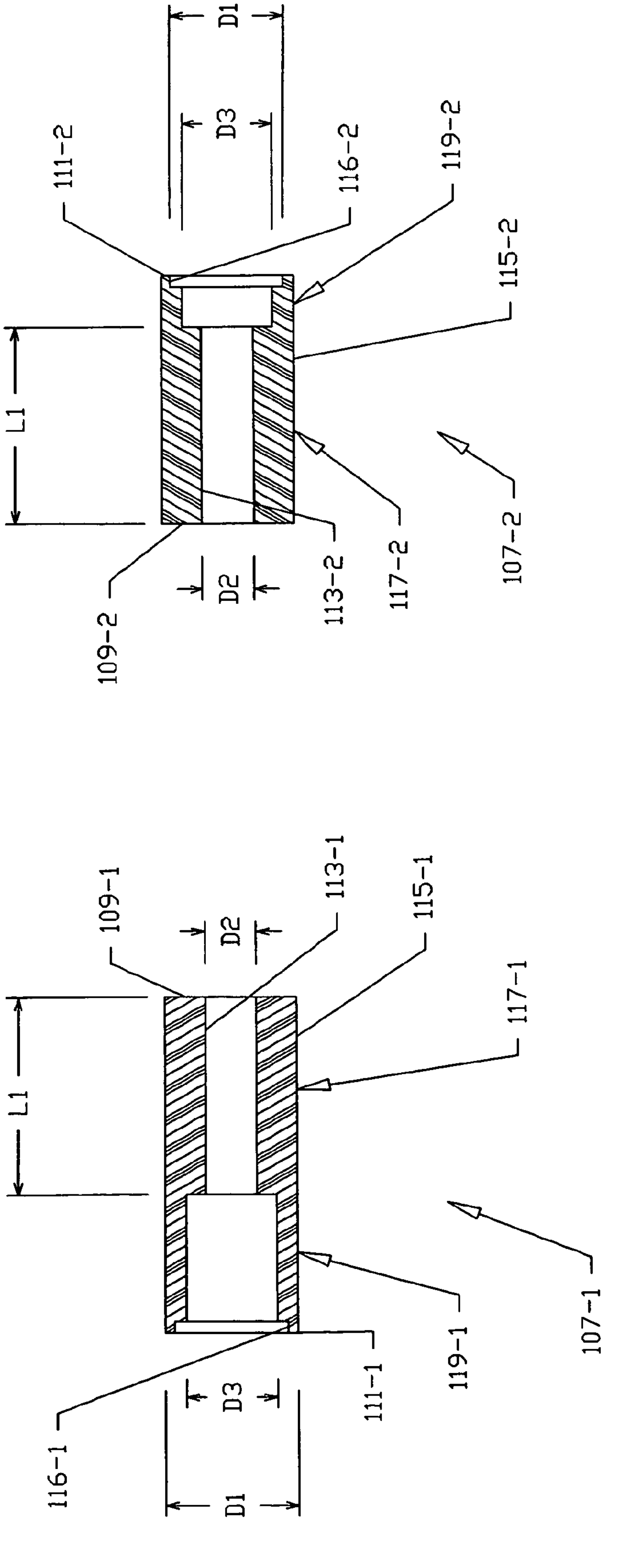
FIG. 8 is an enlarged, section view of the pair of insulators shown in FIG. 2.

Referring now to FIGS. 2 and 8, first and second insulators 107-1 and 107-2 are axially mounted onto inner conductor 55 on opposite sides of tap conductor 71, insulators 107 being dimensioned to substantially fill in the portion of central cavity 21 between inner conductor 55 and outer conductor 13. Together, insulators 107 serve to both mechanically support inner conductor 55 and electrically insulate inner conductor 55 from outer conductor 13, insulators 107 being constructed of any conventional insulated material, such as Teflon® (PTFE). As will be described further in detail below, the particular configuration of insulators 107 provides device 11 with notable properties and, as such, serves as a novel feature of the present invention.

As seen most clearly in FIG. 2, first insulator 107-1 is preferably wedged firmly between flattened surface 79-1 of tap conductor 71 and inner end 43 of bushing 39. Similarly, second insulator 107-2 is preferably wedged firmly between flattened surface 79-2 of tap conductor 71 and inner end 49 of collar 47. In this manner, insulators 107 are held firmly in place and are otherwise incapable of longitudinal displacement, which is highly desirable.

Referring now to FIG. 8, first insulator 107-1 is constructed as an elongated, annular member that includes a first end 109-1, a second end 111-1, an inner surface 113-1 and an outer surface 115-1. As can be seen, the outer diameter $D_1$ of first insulator 107-1 remains fixed in value at approximately 8.0 mm along the majority of its length and roughly approximates the inner diameter of outer conductor 13 within central cavity 21. To the contrary, the inner diameter of first insulator 107-1 varies along its length. Specifically, first insulator 107-1 includes a first inner diameter $D_2$ at first end 109-1 that remains fixed in value at approximately 3.1 mm along a portion of its length and that roughly approximates the outer diameter of inner conductor 55. However, first insulator 107-1 additionally includes a second inner diameter $D_3$ proximate second end 111-1 that remains fixed in value at approximately 5.4 mm along a separate portion of its length, diameter $D_3$ being greater in value than diameter $D_2$. Lastly, it should be noted that first insulator 107-1 is represented herein as having a small step 116-1 at second end 111-1 to assist in regulating the performance of device 11. It is to be understood that the variation in its inner diameter serves to separate insulator 107-1 into a reduced inner diameter section 117-1 at first end 109-1 and an expanded inner diameter section 119-1 at second end 111-1.

Similarly, second insulator 107-2 is constructed as an elongated, annular member that includes a first end 109-2, a second end 111-2, an inner surface 113-2 and an outer surface 115-2. As can be seen, the outer diameter $D_1$ of second insulator 107-2 remains fixed in value at approximately 8.0 mm along the majority of its length and roughly approximates the inner diameter of outer conductor 13 within central cavity 21. To the contrary, the inner diameter of second insulator 107-2 varies along its length. Specifically, second insulator 107-2 includes a first inner diameter $D_2$ at first end 109-2 that remains fixed in value at approximately 3.1 mm along a portion of its length and that roughly approximates the outer diameter of inner conductor 55. However, second insulator 107-2 additionally includes a second inner diameter $D_3$ proximate second end 111-2 that remains fixed in value at approximately 5.4 mm along a separate portion of its length, diameter $D_3$ being greater in value than diameter $D_2$. Lastly, it should be noted that first second 107-2 is represented herein as having a small step 116-2 at second end 111-2 to assist in regulating the performance of device 11. It is to be understood that the variation in its inner diameter serves to separate insulator 107-2 into a reduced inner diameter section 117-2 at first end 109-2 and an expanded inner diameter section 119-2 at second end 111-2.

It should be noted that the reduced inner diameter section 117 of each insulator 107 has a fixed length $L_1$ of approximately 12.0 mm. As can be appreciated, the particular configuration of each section 117 produces a corresponding length of impedance along inner conductor 55 that is less than the nominal transmission line impedance (under 50 ohms) and which thereby enables tap conductor 71 to operate properly as a quarterwave shunting element.

By comparison, because the second inner diameter $D_3$ of each insulator 107 is greater than the outer diameter of inner conductor 55, a secondary dielectric region in the form of annular air gaps 121-1 and 121-2 is defined therebetween, as seen most clearly in FIG. 2. As can be appreciated, the inclusion of air gaps 121-1 and 121-2 between insulators 107 and inner conductor 55 produces a corresponding length of impedance along inner conductor that is roughly equal to the nominal transmission line impedance (usually 50 or 75 ohms), thereby providing device 11 with wideband characteristics, which is highly desirable.

The length of each section 119-1 and 119-2 can be modified as needed to permit the overall length of device 11 to be increased to facilitate its use in a wide variety of different applications (e.g., insertion through panels of varying thicknesses). However, it should be noted that the particular design of insulators 107 enables the overall length of device 11 to be increased without otherwise degrading its wideband performance and, as such, serves as a principal novel feature of the present invention.

As noted above, each end of device 11 is designed for connection with a mating electric device, such as a complementary cable, connector or the like. In this manner, protective device 11 can be used to transmit a communication signal from a source to a load.

Figure 9:
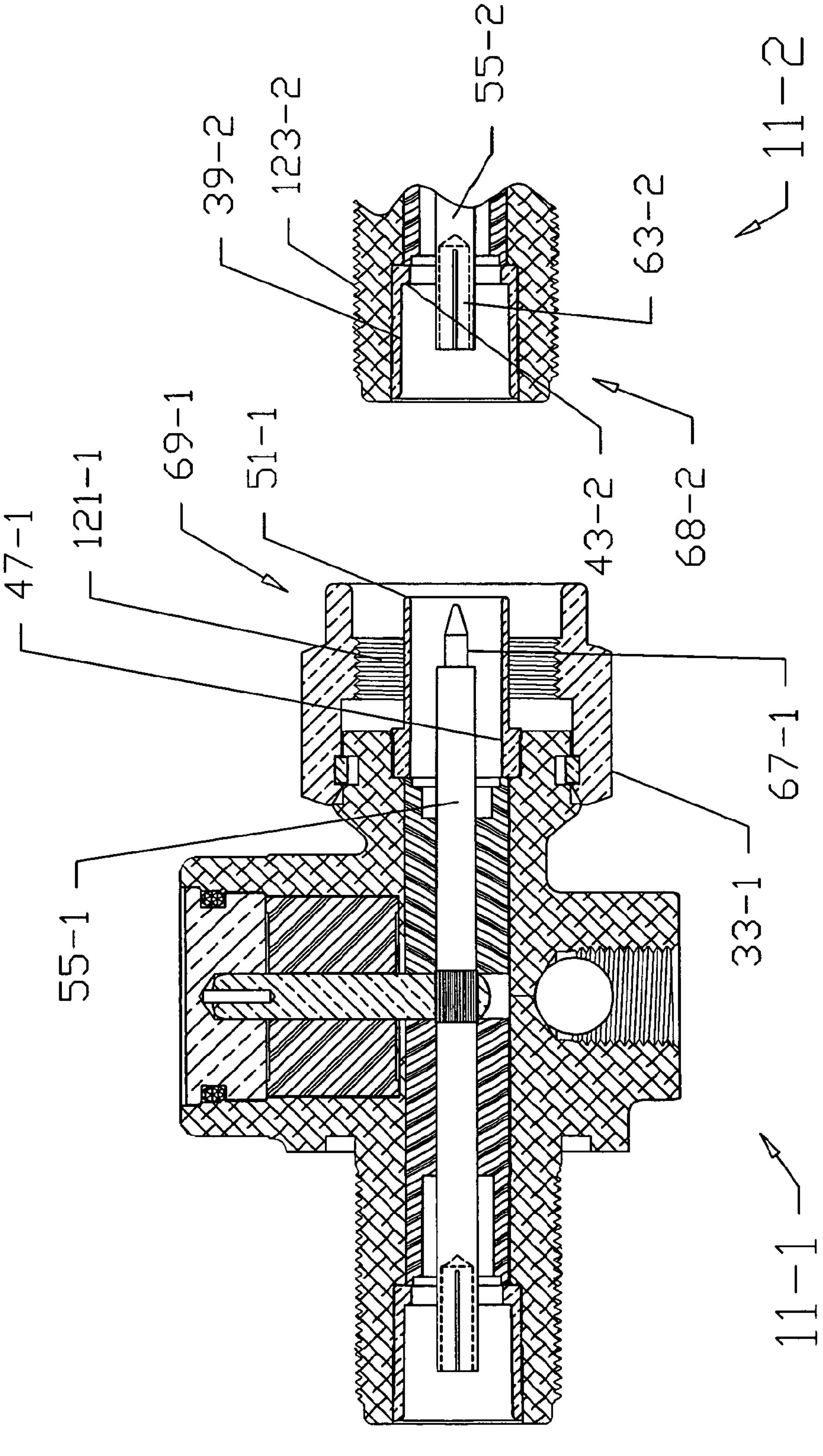
FIG. 9 is a fragmentary section view of a pair of the protective devices shown in FIG. 2, the pair of devices being shown spaced apart and in axial alignment with one another as part of an illustrative coupling process.

Referring now to FIG. 9, there is shown a fragmentary section view of a pair of protective devices 11-1 and 11-2 that is useful in understanding how each end of protective device 11 is designed to be coupled to a mating connector.

It should be noted that a pair of identical protective devices 11-1 and 11-2 is shown herein for simplicity purposes only. Rather, it is to be understood that device 11 is designed to be similarly coupled to alternative styles and types of electric devices without departing from the spirit of the present invention.

It should also be noted that protective device 11 is not limited to the particular style, type or arrangement of connectors at each end. Rather, it is to be understood that the type of connector (i.e., male or female) or style (i.e., industry-standard plug, jack or the like) could be modified without departing from the spirit of the present invention.

As can be seen, the male coaxial connector interface 69-1 formed at one end of device 11-1 is disposed in axial alignment with the corresponding female coaxial connector interface 68-2 formed at one end of device 11-2. Protective devices 11-1 and 11-2 are then drawn towards one another until the internal threadings 121-1 on coupling nut 33-1 engage the external threadings 123-2 on device 11-2. Engaged as such, coupling nut 33-1 is then rotated in the clockwise direction which, in turn, pulls female coaxial connector interface 68-2 axially towards male coaxial connector interface 69-1.

As device 11-2 is drawn towards device 11-1, male connector pin 67-1 fittingly protrudes into female receptacle 63-2, thereby establishing a conductive path between inner conductor 55-1 for device 11-1 with inner conductor 55-2 for device 11-2.

Similarly, as device 11-2 is drawn towards device 11-1, collar 47-1 is disposed in contact against the inner surface of bushing 39-2. Collar 47-1 preferably slides along bushing 39-2 until outer end 51-1 of collar 47-1 is drawn firmly in contact against inner end 43-2 of bushing 39-2, thereby establishing a conductive path between collar 47-1 with bushing 39-2.

In this manner, it is to be understood that the electrical contact surfaces for each device 11 are limited to (i) first end 57 and second end 59 of inner conductor 55, (ii) inner end 43 of bushing 39 and (iii) outer end 51 of collar 47. As defined herein, the electrical contact surfaces for device 11 relates to the conductive surfaces through which communication signals within the desired frequency band are directly transmitted from device 11 to a mating device connected thereto. As a result, it is clear that outer conductor 13 does not serve as an electrical contact surface through which a communication signal is sent to a mating device. Accordingly, it is to be understood that outer conductor 13, which is relatively large in size, can be manufactured out of a softer, less expensive material without compromising the quality of the connection that can be otherwise achieved with device 11, which is highly desirable.

As described in detail above, connector interfaces 68 and 69 enable device 11 to be coupled to complementary electrical components that are similarly designed to receive and/or transmit the desired communication signal. However, it should be noted that device 11 is also provided with means for coupling outer conductor 13 to items that are not designed to receive and/or transmit the desired communication signal, as will be described further in detail below.

Figure 10A:
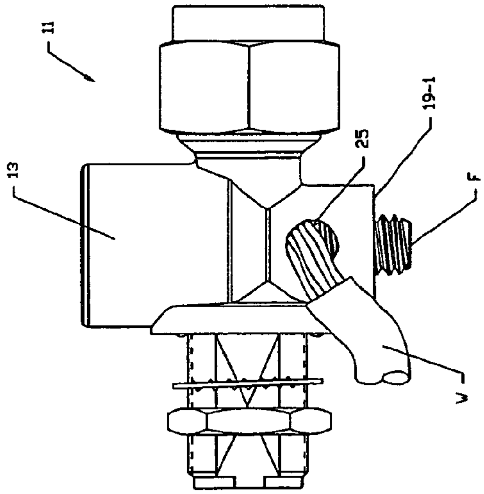
FIGS. 10(*a*), 10(*b*) and 10(*c*) are front plan views of the protective device shown in FIG. 1, the protective device being shown with a ground wire, a panel and a wire lug fitting, respectively, coupled thereto.
Figure 10B:
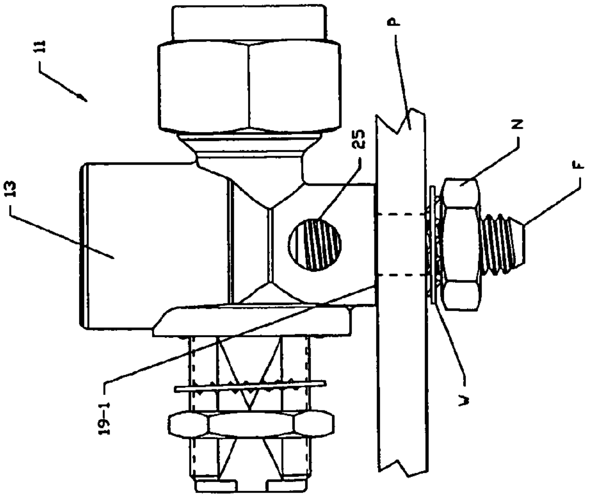
Figure 10C:
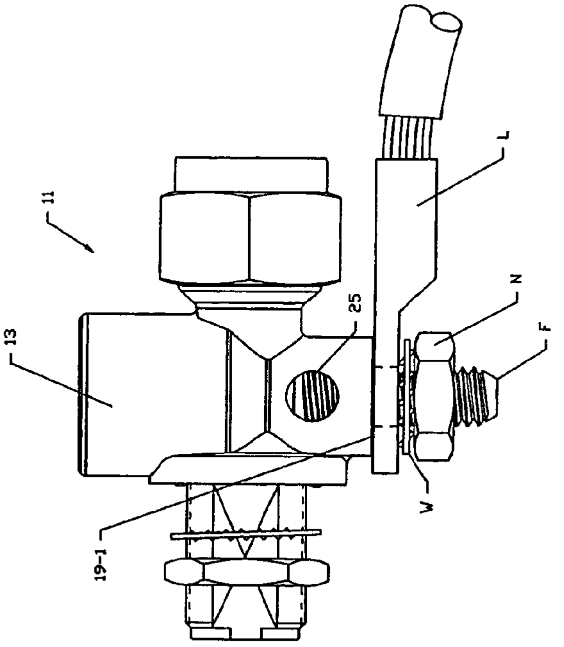

Specifically, referring now to FIG. 10(*a*), there is shown a front plan view of device 11 with a ground wire W, stripped at one end, inserted into cross hole 25 and held firmly in place by and in contact against outer conductor 13 by a threaded fastener F inserted into bore 27. As a result of this connection, wire W serves to ground outer conductor 13, which is highly desirable.

In addition to the aforementioned grounding application, it should be noted that device 11 is specifically designed such that flattened surface 19-1 into which bore 27 is formed can be utilized as a mounting surface against which further objects can be secured. Accordingly, it is to be understood that a single threaded fastener F can be used to both (i) couple a ground wire W to outer conductor 13 in the manner set forth above and (ii) mount device 11 to a secondary object and, as a result, serves as a novel feature of the present invention.

In particular, referring now to FIG. 10(*b*), there is shown a front plan view of device 11 being secured to a panel P using the combination of threaded fastener F, a lock washer W and a hex nut N. Specifically, with one surface of flattened panel P disposed against mounting surface 19-1, threaded fastener F is disposed through panel and into threaded engagement with bore 27. Because the inner terminus of bore 27 is in communication with cross hole 25, it is to be understood that threaded fastener F could additionally serve to couple a ground wire disposed through cross hole 25 to outer conductor 13. To help retain panel P against mounting surface 19-1, lock washer W and hex nut N are axially mounted onto fastener F and tightened.

Threaded fastener F is preferably 8.0 mm in diameter. As can be appreciated, it is required that fastener F have a diameter of at least 5.0 mm in order to provide it with the strength necessary to retain device 11 mounted onto a secondary object, such as panel P.

Referring now to FIG. 10(*c*), there is shown a front plan view of device 11 being secured to the fitting for a wire lug L using the combination of threaded fastener F, a lock washer W and a hex nut N. Specifically, with one surface of wire lug L disposed against mounting surface 19-1, threaded fastener F is disposed through an opening in wire lug L and into threaded engagement with bore 27. Because the inner terminus of bore 27 is in communication with cross hole 25, it is to be understood that threaded fastener F could additionally serve to couple a ground wire disposed through cross hole 25 to outer conductor 13. To help retain wire lug L against mounting surface 19-1, lock washer W and hex nut N are axially mounted onto fastener F and tightened.

The embodiment of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A protective device for transmitting electromagnetic signals of a desired frequency band, the protective device comprising:

(a) an outer conductor comprising a first end, a second end and an intermediary section, (b) an inner conductor extending within the outer conductor, the inner and outer conductors being spaced apart and electrically insulated from one another, (c) a first contact conductively mounted onto the first end of outer conductor, the first contact being constructed of a material that is different than the outer conductor, (d) a second contact conductively mounted onto the second end of the outer conductor, the second contact being constructed of a material that is different than the outer conductor, (e) wherein the inner conductor, the first contact and the second contact are the only electrical contact surfaces for the protective device that transmit electromagnetic signals within the desired frequency band.

2. The device as claimed in claim 1 wherein each of the first and second contacts is constructed of a material from the group consisting of: copper, brass, bronze and copper-based alloys.

3. The device as claimed in claim 1 wherein the outer conductor is constructed of a material from the group consisting of: aluminum, zinc, aluminum-based alloys and zinc-based alloys.

4. The device as claimed in claim 1 wherein the intermediary section of the outer conductor includes a flattened mounting surface, the intermediary section being shaped to define a transverse cross hole and a threaded bore, the threaded bore extending in an orthogonal relationship relative to the cross hole, the threaded bore extending in from the flattened mounting surface and terminating in communication with the transverse cross hole.

5. A protective device for transmitting electromagnetic signals, the protective device comprising:

(a) an outer conductor, the outer conductor being hollowed out along its length so as to define a longitudinally extending central cavity, (b) an inner conductor extending within the central cavity in the outer conductor, the inner conductor being spaced apart from the outer conductor, the inner conductor comprising a first end and a second end, the first end of the inner conductor at least partially defining a first connector interface, the second end of the inner conductor at least partially defining a second connector interface, and (c) at least one insulator of a first dielectric material disposed in the central cavity between the inner conductor and the outer conductor, the at least one insulator being hollowed out along its length, the at least one insulator comprising a first end, a second end, an inner surface and an outer surface, each of the first and second ends of the at least one insulator being set in from the first and second connector interfaces, (d) wherein the outer diameter of the at least one insulator is constant along its length from its first end to its second end and wherein the inner diameter of the at least one insulator is less at its first end than at its second end.

6. The protective device as claimed in claim 5 wherein the outer surface of the at least one insulator is disposed in contact against the outer conductor along the entirety of its length.

7. The protective device as claimed in claim 6 wherein the inner surface of the at least one insulator at its first end is disposed in contact against the inner conductor.

8. The protective device as claimed in claim 7 wherein the inner surface of the least one insulator at its second end is spaced away from the inner conductor.

9. The protective device as claimed in claim 8 wherein the inner surface of the at least one insulator at its second end is spaced away from the inner conductor by a second dielectric material.

10. The protective device as claimed in claim 5 wherein the outer diameter of the at least one insulator is approximately equal to the diameter of the central cavity in the outer conductor.

11. The protective device as claimed in claim 10 wherein the inner diameter of the at least one insulator at its first end is approximately equal to the outer diameter of the inner conductor.

12. The protective device of claim 11 wherein the roughened section of the inner conductor extends approximately 360 degrees about its longitudinal axis.

13. The protective device as claimed in claim 11 wherein the tap conductor is constructed of a softer material than the inner conductor.

14. The protective device as claimed in claim 13 wherein the roughened section of the inner conductor at least partially digs into the tap conductor.

15. A protective device for transmitting electromagnetic signals of a desired frequency band, the protective device comprising:

(a) an outer conductor, (b) an inner conductor extending within the outer conductor, the inner and outer conductors being spaced apart and electrically insulated from one another, the inner conductor comprising a first end, a second end and an intermediary portion, the intermediary portion being unitary in its construction and including a roughened section that serves as the region of contact with the first end of the tap conductor, and (c) a tap conductor for discharging transient voltages carried by the inner conductor that fall outside the desired frequency band, the tap conductor comprising a first end and a second end, the first end of the tap conductor being shaped to define a transverse opening, (d) wherein the intermediary portion of the inner conductor is press-fit through the transverse opening and into conductive contact with the tap conductor.

16. A protective device for transmitting electromagnetic signals of a desired frequency band, the protective device comprising:

(a) an outer conductor, (b) an inner conductor extending within the outer conductor, the inner and outer conductors being spaced apart and electrically insulated from one another, the inner conductor comprising a first end, a second end and an intermediary portion, (c) a tap conductor for discharging transient voltages carried by the inner conductor that fall outside the desired frequency band, the tap conductor comprising a first end and a second end, the first end of the tap conductor being shaped to define a transverse opening, the second end of the tap conductor being shaped to include at least one slot which separates the second end of the tap conductor into a plurality of independently movable fingers, the second end of the tap conductor being additionally shaped to include a central longitudinal bore located between the plurality of fingers, (d) a coiled spring pin fittingly inserted between the plurality of fingers in the second end of the tap conductor, the coiled spring pin being dimensioned to displace radially outward each of the plurality of fingers, (e) an end cap conductively coupled to the outer conductor, the end cap being shaped to fittingly receive the second end of the tap conductor, (f) wherein the intermediary portion of the inner conductor is press-fit through the transverse opening and into conductive contact with the tap conductor.

* * * * *